US005476292A

United States Patent [19]
Harper

[11] Patent Number: 5,476,292
[45] Date of Patent: Dec. 19, 1995

[54] PIPE COUPLINGS

[75] Inventor: Brian Harper, Hitchin, England

[73] Assignee: Victaulic PLC, Hertfordshire, England

[21] Appl. No.: 335,032

[22] Filed: Nov. 7, 1994

[51] Int. Cl.$^6$ .................................................. F16L 17/06
[52] U.S. Cl. ...................... 285/337; 285/334.4; 285/342; 285/369; 285/910
[58] Field of Search ..................... 285/337, 342, 285/177, 369, 379, 334.4, 910

[56] References Cited

U.S. PATENT DOCUMENTS

| | | | |
|---|---|---|---|
| 2,247,032 | 6/1941 | Norton | 285/342 X |
| 3,740,082 | 6/1973 | Schustack | 285/369 X |
| 3,857,589 | 12/1974 | Oostenbrink | 285/379 X |
| 4,136,897 | 1/1979 | Haluch | 285/342 |
| 4,395,060 | 7/1983 | Lapham | 285/369 X |
| 4,569,542 | 2/1986 | Anderson et al. | 285/337 |
| 5,150,929 | 9/1992 | Greatorex | 285/337 X |

*Primary Examiner*—Dave W. Arola
*Attorney, Agent, or Firm*—Kinney & Lange

[57] ABSTRACT

A pipe coupling comprises an annular sleeve member arranged in use at a free end thereof to overly an end of a plain ended pipe to be connected by the coupling, the free end of the sleeve member being inclined radially outwardly towards its end; an elastomeric annular sealing gasket disposed at least partly within the inclined free end of the sleeve member and held in place by an annular compression flange member; the compression flange having a skirt portion, axially outwardly, and an axially inwardly extending collar portion radially outwardly overlying the free end of the sleeve member; the gasket including, when in a relaxed condition, an axially outwardly directed rear surface arranged in use to engage an axially inwardly directed face of the annular radially inwardly extending portion of the flange member, a radially inner surface extending generally axially inwardly of the coupling from a gasket heel to a gasket toe, and an inclined surface extending generally between the two above mentioned surfaces of the gasket member and arranged in use to engage the inclined surface of the free end of the annular sleeve member; the inclined surface of the gasket being, in the relaxed condition, at a lesser angle than the inclined surface of the free end of the sleeve member with respect to the longitudinal axis of the coupling, and the rear surface of the gasket being slidable radially inwardly on the annually inner surface of the skirt portion of the flange, radial inward movement or tendency thereof to move being limited by engagement between shoulder portions on the rear face of the gasket and the axially inner surface of the flange member; and tightening elements associated with the compression flange member for applying in use the compressive force on the gasket whereby to ensure sealing of the gasket.

12 Claims, 2 Drawing Sheets

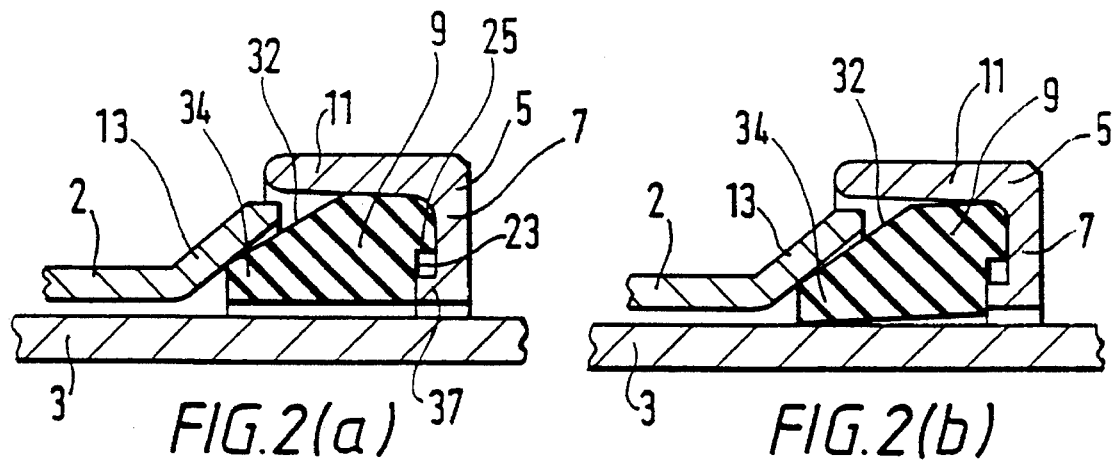
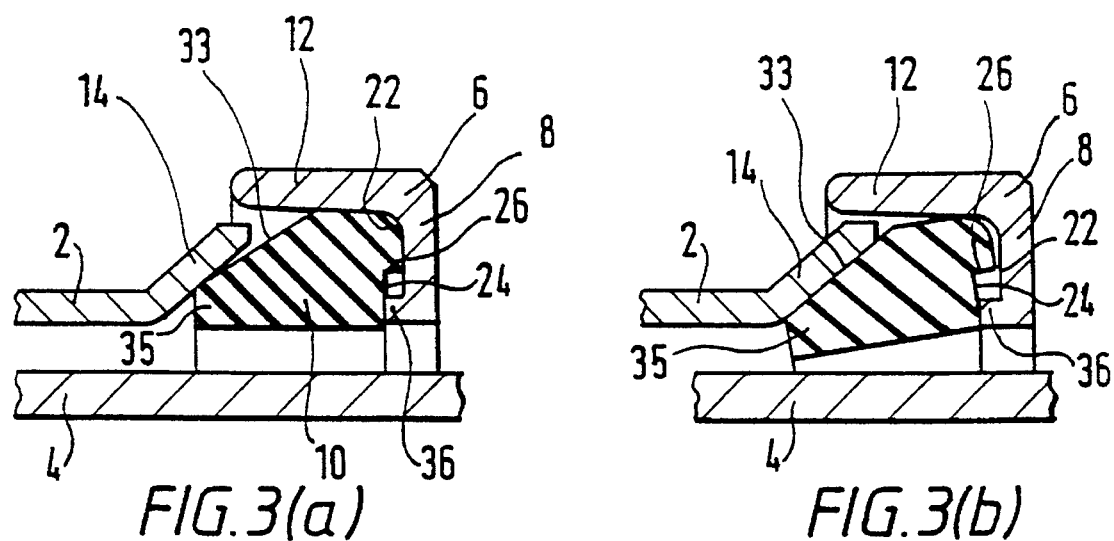
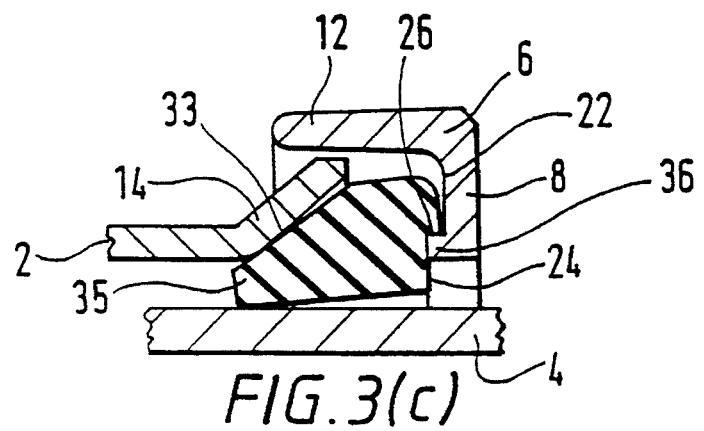

PIPE COUPLINGS

BACKGROUND OF THE INVENTION

This invention relates to pipe couplings and more particularly to pipe couplings of the kind adapted to connect together a plain ended pipe to another pipe. It is to be understood that the expression "pipe" as used herein includes pipes and tubes as such and also pipe-like members and fittings for use in pipework such as bends, elbows, "T" connectors, flange adaptors and parts and devices adapted to be fitted to pipework such as valves and pumps. Such pipes may have a variety of end configurations, and may, for example, be plain ended or flange ended. Pipe couplings of the kind referred to above commonly comprise an annular sleeve member for overlying the end of the plain ended pipe, a sealing gasket disposed in use in an annular disposition at one end of the sleeve member about the plain ended pipe, an annular compression flange disposed at the one end of the sleeve and arranged to be drawn axially against the sealing gasket by tightening means to cause the sealing gasket to be forced into sealing contact between the sleeve member and the outer periphery of the plain ended pipe located within the sleeve. Such pipe couplings can be formed, for example, predominantly of malleable iron, steel, or plastics material, the gaskets being of an appropriate elastomeric material.

Pipe couplings of this kind are often used for connecting two abutting plain ended pipes, in which case sealing gaskets and compression flanges are provided at both ends of the sleeve member, and tightening means usually connect between the two flanges. Commonly, such pipes are two pipes as such or a pipe and the plain end of a flange adaptor, for example.

The pairs of compression flanges for such couplings may be provided with tightening means connecting together the flanges and may comprise bolts passing along the length of the sleeve and through apertures spaced around the outer radially extremities of the flanges, such bolts being provided with a head at one end and carrying a nut at the other so that the flanges are drawn together by tightening the nuts on the bolts. Alternatively, the compression flanges may screw into or onto the ends of the sleeve.

Whilst such pipe couplings are widely used, historically a particular size coupling was only capable of dealing with a limited outside diameter range of plain ended pipes because of the constraints imposed by the use of an axially movable annular compression flange to compress the annular sealing gasket between the inner peripheral wall of the sleeve and the outer peripheral wall of the plain ended pipe to be connected and sealed by means of the coupling.

Attempts have been made to increase the range of pipes capable of being connected by individual couplings by coupling designs having annular gaskets of substantial gasket volume such that upon axial compression thereof, substantial radial distortion and expansion can occur so as to span an annulus of significant size between the interior of the coupling and the pipe to be sealed and connected thereby. However, constraints of cost on the volume of gasket used, and limits on reasonable possible compressive forces applicable on the gaskets still provide a significant restriction on the range of pipe sizes that can be accommodated by any one coupling whilst there is an ever increasing demand for such couplings for use with a wider size range of pipes. In addition technical problems arise in a tendency during axial compression for uneven axial movement of the sealing gasket and hence of the flange, about the pipe axis which can lead to serious jointing and sealing weakness.

It is an object of the present invention to overcome or at least substantially reduce the above-mentioned problems.

SUMMARY OF THE INVENTION

In accordance with the present invention there is provided a pipe coupling comprising an annular sleeve member arranged in use at a free end thereof to overly an end of a plain ended pipe to be connected by the coupling, the free end of the sleeve member being inclined radially outwardly towards its end; an elastomeric annular sealing gasket disposed at least partly within the inclined free end of the sleeve member and held in place by means of an annular compression flange member; the compression flange having a skirt portion, axially outwardly of the free end of the sleeve member, extending radially inwardly, and an axially inwardly extending collar portion radially outwardly overlying the free end of the sleeve member; the gasket including, when in a relaxed condition, an axially outwardly directed rear surface arranged in use to engage an axially inwardly directed face of the annular radially inwardly extending portion of the flange member, a radially inner surface extending generally axially inwardly of the coupling from a gasket heel to a gasket toe, and an inclined surface extending generally between the two above mentioned surfaces of the gasket member and arranged in use to engage the inclined surface of the free end of the annular sleeve member; the inclined surface of the gasket being, in the relaxed condition, at a lesser angle than the inclined surface of the free end of the sleeve member with respect to the longitudinal axis of the coupling, and the rear surface of the gasket being slidable radially inwardly on the annually inner surface of the skirt portion of the flange, radial inward movement or tendency thereof to move being limited by engagement between shoulder portions on the rear face of the gasket and the axially inner surface of the flange member; and tightening means associated with the compression flange member for applying in use the compressive force on the gasket whereby to ensure sealing of the gasket.

In use of the coupling according to the invention, to form a joint with a pipe of large outside diameter within the coupling range, the operational sequence is as follows:

The tightening means exerts increasing axial pressure upon the flange which transmits this to the gasket. Due to the different angles between the inclined surface of the free end of the annular sleeve member and the inclined surface of the gasket, the progressive movement of the gasket is to tilt (by its toe sliding axially and radially inwards along the inclined surface of the sleeve) and deform such that the inclined surface tends to become, and if sufficient movement is possible before the toe of the gasket bears upon the pipe, becomes parallel to the inclined surface of the sleeve. Thereafter, if the toe of the gasket is still not bearing on the pipe, its inclined surface slides down the now complimentary inclined surface of the sleeve until the gasket toe does bear upon the pipe, and at the same time the heel of the gasket deforms radially and axially inwardly and the gasket slides down (to the extent possible with a large diameter pipe) radially inwardly of the inner surface of the skirt portion, until the radially inner surface of the gasket engages at the toe and then at the heel of the gasket upon the pipe. Thereafter any further axial force imposed by the tightening means will cause, via the flange, continuing "wedge" compression of the gasket to seal between the relevant parts of the coupling and the external periphery of the large diameter pipe.

With a pipe of low outside diameter within the coupling range, the operational sequences is generally as set out above with respect to a large outside diameter pipe, except that in this case, after the tilting, sliding, and deformation of the gasket so that its inclined surface is parallel to that of the inclined surface of the sleeve, a significantly greater radial and axial inward movement of the toe of the gasket is brought about by considerable axial movement of the tightening means and the flange as the inclined surface of the gasket slides down the now complimentary inclined surface of the sleeve. At the same time as this axial and radial inward movement of the toe of the gasket, the rear face of the gasket slides radially inwardly upon the inner surface of the skirt portion to a greater extent than occurs with a pipe of large outside diameter, and may be such that it continues until further movement is prevented by engagement between the shoulder portions of the rear face of the gasket and the axially inner surface of the flange member. Thereafter, under continuing axial compression, the toe of the gasket is forced on to the outer periphery of the low diameter pipe under increasing contact pressure.

Operation of the coupling, in addition to enabling the sealing of a substantial width of range of outside diameter pipe, also reduces most significantly the risk of uneven movement, axially and radially, of the gasket upon flange compression, since the initial movement (which comprises the great majority of movement) of the gasket, both axially and radially, under compression from the flange is relatively easy with limited frictional resistance as the gasket tilts and slides both radially and axially inwardly before becoming much harder once the associated sleeve and gasket inclined surfaces are parallel, whereafter the radially inward movement of the heel of the gasket becomes possible. This sequence of events inevitably leads to a far lesser risk for unequal final disposition of the gasket, and hence the flange, within a finished joint.

It will be appreciated from this operational description that the differently inclined surfaces of the gasket and sleeve, and the facility for inward radial movement of the heel of the gasket are important aspects of the present invention. Again, the mutually engaging shoulders on the rear face of the gasket and the skirt portion of the flange greatly assists the general centralisation of the gasket within the coupling, thereby enabling centralisation of the coupling on a pipe to take place, this being particularly manifest on pipes of lower outside diameter within the coupling range. This has the advantage of preventing any unacceptable localised gasket extrusion at any point around the gasket between the flange and the pipe to be coupled, which could otherwise threaten to lead to premature failure of the coupling.

The coupling of the invention may be provided for connecting two abutting plain ended pipes and may therefore include compression flange members, sealing gaskets, and tightening means at each end of a double ended sleeve member having outwardly inclined ends at each end.

The invention includes within its scope a pipe joint comprising a coupling as herein defined mounted upon at least one plain ended pipe.

Where the coupling is provided for two abutting plain ended pipes, the tightening means may comprise bolts or screws extending between radially outwardly extending portions of the compression flange members at each end of the open ended sleeve member.

The pipe engaging, generally axial, surface of the gasket may be provided with a plurality of ridges to provide a multiplicity of high pressure contact points to assist in sealing.

BRIEF DESCRIPTION OF THE DRAWINGS

In order that the invention may be more readily understood one embodiment thereof will now be described by way of example with reference to the accompanying drawings in which:

FIG. 2 (a) and (b) illustrate schematically part of jointing operational sequence on a large pipe; and FIG. 3 (a), (b) and (c) illustrate schematically part of jointing operations sequence on a small pipe.

DETAILED DESCRIPTION OF THE PREFERRED EMBODIMENTS

Figure 1:
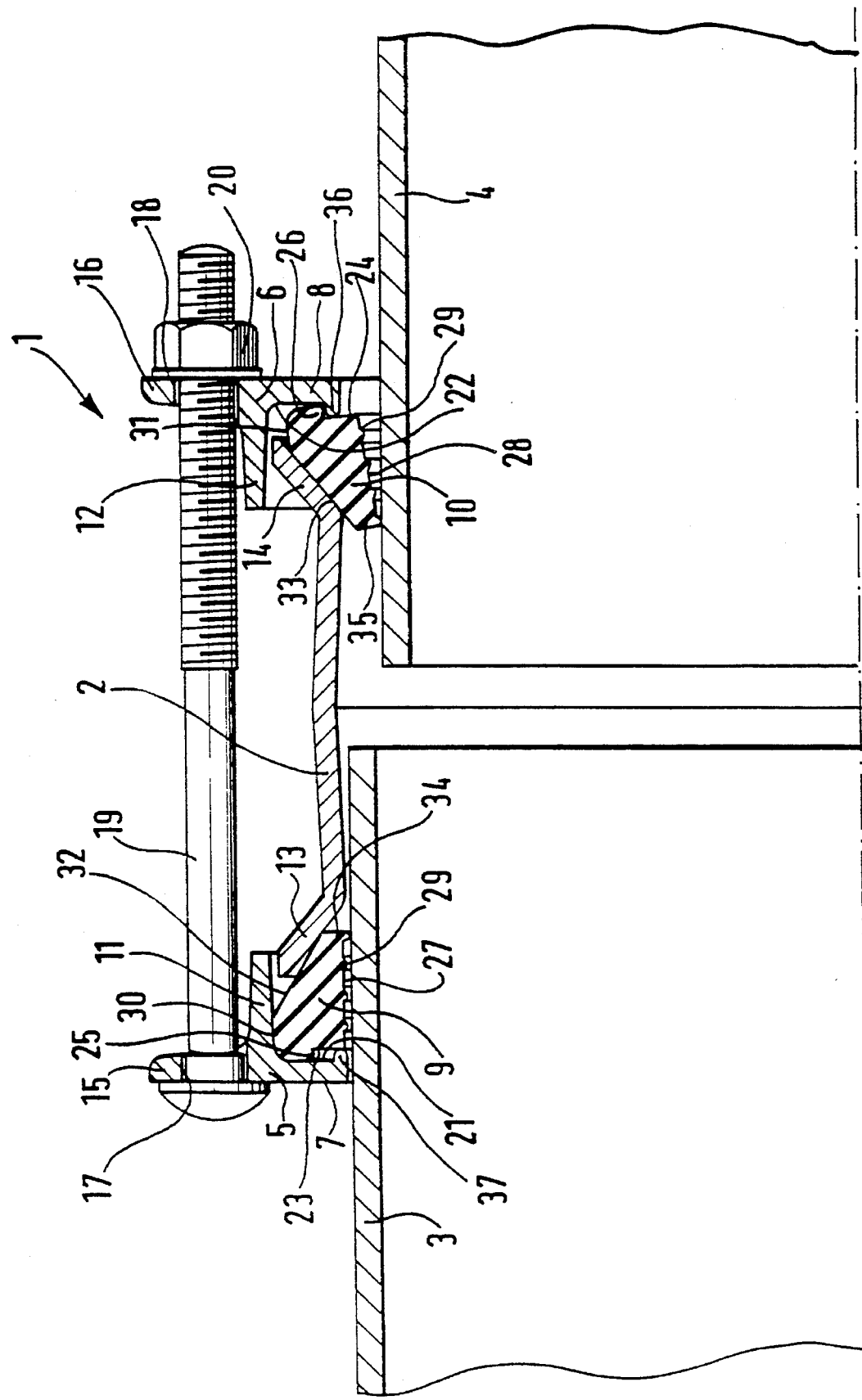
FIG. 1 shows a coupling in accordance with the invention forming on the left hand side a joint with a large outside diameter pipe within the range to be connected, and forming on the right hand side a joint with a small outside diameter pipe within the range to be connected.

Referring now to the drawings it will be seen that a coupling 1 comprises a double open ended sleeve 2, having radially outwardly inclined ends 13, 14, extending across the juxtaposed ends of two pipes 3, 4 to be coupled. The pipe 3 on the left hand side is of a large outside diameter within the range of pipes to be coupled by means of the invention, whilst the pipe 4 on the right hand side is of a small outside diameter of the range of pipes to be coupled by means of the particular size coupling illustrated. At each end of the sleeve 2 there is provided a compression flange member 5, 6 each of which includes a radially inwardly extending annular skirt portion 7, 8, the axially inner face of which engages the rear face of a gasket 9, 10 as hereinafter described. Each flange member also incorporates an inwardly axially extending collar portion 11, 12 of annular configuration arranged to overly the outwardly inclined ends 13, 14 of the sleeve 2. Finally a radially outwardly extending portion 15, 16 of each flange member of annular configuration is provided with a plurality of bores 17, 18 (one shown at each end only) through which bolts 19 may be passed for engagement with nuts 20 to provide axial compression to the coupling for make up of the joint.

Disposed within the gap between the pipe 3, 4 at each end, the inclined end 13, 14 of the sleeve 2, and the radially inner surface 21, 22 of the skirt 7, 8 flange member, is a gasket 9, 10 which, in general terms, is in the form of a right-angled triangle, although significant detailed deviations from that configuration are present as will be described.

Each gasket 9, 10 comprises a rear face 23, 24 which, although in general terms normal to the axis of the coupling is in the form of two steps of separated by a shoulder 25, 26. Extending axially inwardly of the rear surface from the radially inward edge thereof (the heel of the gasket) is a pipe engaging surface 27, 28 having four annular radially inwardly extending ridges 29 for improved sealing contact with the pipe 3, 4 to be sealed thereby.

The rear surface of the gasket turns, at its radially outer end, into a generally axially extending surface 30, 31 which in turn leads to an inclined surface 32, 33 leading to a toe portion of the gasket at the axially inner end thereof.

Upon fitting the sleeve 2 and gaskets 9, 10 and compression flange members 5, 6 about the two pipes 3, 4 to be joined by means of the coupling 1 of the invention, and upon tightening of the nuts 20 and bolts 19 spaced therearound, connection of the coupling 1 about the two pipes 3, 4 is significantly different at each end.

The general sequence of operation of the coupling in forming a joint with the large diameter pipe and the low diameter pipe is as described in general terms hereinabove.

Considering the gasket position at the left hand end of FIG. 1 and referring especially to FIGS. 2 (a) and (b) which show the operational sequence to achieve that position, with the large outside diameter plain ended pipe 3, it is to be seen in FIG. 2 (a) that the inclined end 13 of the sleeve member, which has an angle to the axis of the coupling of the order of 40°T0°T engages the toe end 34 of the inclined surface 32 of the gasket 9 which has an inclination to the axis of the coupling of the order of 300 Manifestly from such difference in inclination it is to be appreciated that upon axial force from the skirt portion 7 of the flange member, the gasket 9 is tilted and urged axially and radially inwards by the inclined end 13 of the sleeve 2 upon axial force being applied to the gasket from the flange member 5 until the gasket toe 34 bears upon the pipe 3 as shown in FIG. 2 (b). Thereafter the heel of the gasket is urged radially inwards down the flange skirt portion 8 again to increase its bearing on the pipe 3 at this end. Sealing of the gasket about the pipe is therefore achieved without any great movement of the gasket 9 additional to compression movement provided by the compressive forces imposed upon it.

The position of the gasket achieved at the right hand end of the coupling shown in FIG. 1 is, however, totally different. Referring to FIG. 3 (a), the axial force exerted upon the rear surface 24 of the gasket by the axially inner surface 22 of the skirt portion 8 of the flange member 6 firstly tilts the gasket and slides the toe 35 of the gasket down the inclined surface of the sleeve radially and axially inwardly until the inclination of the inclined end 14 of the sleeve is the same as that as the inclined surface 33 of the gasket 10 (see FIG. 3 (b)), whereafter the gasket 10 moves radially inwardly with the rear surface 24 sliding radially inwardly on the axially inner face of the skirt 8 until (as shown in FIG. 3 (c)) the toe end 35 of the gasket 10 engages upon the pipe 4, and the shoulder 26 of the gasket 10 engages upon an axially inwardly extending shoulder 36 of the skirt portion of the flange member 6, which limits any further radially inward movement of the rear surface 24 of the gasket 10, and additionally inhibits any tendency, due to pressure within the pipe, of extrusion of the gasket through the gap separating the radially inward end of the skirt 8 from the outer surface of the pipe 4. Flange 5 is provided with a like shoulder 37. In the disposition shown, sealing between the toe end 35 of the gasket 10 and the pipe 4 adequately provides a sealed connection with the coupling, so that overall a satisfactory sealed joint between two pipes 3, 4 and the coupling 1 is achieved.

It is to be understood that the foregoing is merely exemplary of couplings, and joints made therewith in accordance with the invention and that modifications can readily be made thereto without departing from the true scale of the invention. Thus for example the inclined ends of the sleeve may include portions having different angles of inclination, or could, at least in part, be curved to provide varying inclination.

What is claimed is:

1. A pipe coupling comprising an annular sleeve member arranged in use at a free end thereof to overly an end of a plain ended pipe to be connected by the coupling, the free end of the sleeve member being inclined radially outwardly towards its end; an elastomeric annular sealing gasket disposed at least partly within the inclined free end of the sleeve member and held in place by means of an annular compression flange member; the compression flange having a skirt portion, axially outwardly of the free end of the sleeve member, extending radially inwardly, and an axially inwardly extending collar portion radially outwardly overlying the free end of the sleeve member and said skirt portion including an axially inwardly directed face; the gasket including, when in a relaxed condition, an axially outwardly directed rear surface and shoulder portions arranged in use to engage said axially inwardly directed face of the annular radially inwardly extending portion of the flange member, a radially inner surface extending generally axially inwardly of the coupling from a gasket heel to a gasket toe, and an inclined surface extending generally between the two above mentioned surfaces of the gasket member and arranged in use to engage the inclined surface of the free end of the annular sleeve member; the inclined surface of the gasket being, in the relaxed condition, at a lesser angle than the inclined surface of the free end of the sleeve member with respect to the longitudinal axis of the coupling, and the rear surface of the gasket being slidable radially inwardly on the annually inner surface of the skirt portion of the flange, radial inward movement or tendency thereof to move being limited by engagement between said shoulder portions on the rear face of the gasket and said axially inner surface of the flange member; and tightening means associated with the compression flange member for applying in use the compressive force on the gasket whereby to ensure sealing of the gasket.

2. The pipe coupling claimed in claim 1 for connecting two abutting plain ended pipes, and including compression flange members, sealing gaskets, and tightening means at each end of a double ended sleeve member, the internal surface of each end of the sleeve member being outwardly inclined.

3. The pipe coupling claimed in claim 2 wherein the tightening means comprises bolts or screws extending between radially outwardly extending portions of the compression flange members at each end of the open ended sleeve member.

4. The pipe coupling claimed in claim 1 wherein the pipe engaging, generally axial, surface of the gasket is provided with a plurality of ridges to provide a multiplicity of high pressure contact points to assist sealing.

5. A pipe joint comprising a pipe coupling, the pipe coupling comprising:

an annular sleeve member arranged in use at a free end thereof to overly an end of a plain ended pipe to be connected by the coupling, the free end of the sleeve member being inclined radially outwardly towards its end;

an elastomeric annular sealing gasket disposed at least partly within the inclined free end of the sleeve member and held in place by means of an annular compression flange member;

the compression flange having a skirt portion, axially outwardly of the free end of the sleeve member, extending radially inwardly, and an axially inwardly extending collar portion radially outwardly overlying the free end of the sleeve member and said skirt portion including an axially inwardly directed face;

the gasket including, when in a relaxed condition, an axially outwardly directed rear surface and shoulder portions arranged in use to engage said axially inwardly directed face of the annular radially inwardly extending portion of the flange member, a radially inner surface extending generally axially inwardly of the coupling from a gasket heel to a gasket toe, and an inclined surface extending generally between the two above mentioned surfaces of the gasket member and arranged in use to engage the inclined surface of the free end of the annular sleeve member;

the inclined surface of the gasket being, in the relaxed condition, at a lesser angle than the inclined surface of the free end of the sleeve member with respect to the longitudinal axis of the coupling, and the rear surface of the gasket being slidable radially inwardly on the annually inner surface of the skirt portion of the flange, radial inward movement or tendency thereof to move being limited by engagement between said shoulder portions on the rear face of the gasket and said axially inner surface of the flange member; and tightening means associated with the compression flange member for applying in use the compressive force on the gasket whereby to ensure sealing of the gasket.

6. The pipe coupling claimed in claim 5 for connecting two abutting plain ended pipes, and including compression flange members, sealing gaskets, and tightening means at each end of a double ended sleeve member, the internal surface of each end of the sleeve member being outwardly inclined.

7. The pipe coupling claimed in claim 6 wherein the tightening means comprises bolts or screws extending between radially outwardly extending portions of the compression flange members at each end of the open ended sleeve member.

8. The pipe coupling claimed in claim 5 wherein the pipe engaging, generally axial, surface of the gasket is provided with a plurality of ridges to provide a multiplicity of high pressure contact points to assist sealing.

9. A pipe coupling comprising:

an annular sleeve member to overly an end of a plain ended pipe to be connected by the coupling;

an annular compression flange member having a skirt portion, axially outwardly of the free end of the sleeve member, extending radially inwardly, and an axially inwardly extending collar portion radially outwardly overlying the free end of the sleeve member and said skirt portion including an axially directed face;

an elastomeric annular sealing gasket disposed at least party within the inclined free end or the sleeve member, including, when in a relaxed condition an axially outwardly directed rear surface and shoulder portions arranged in use to engage said axially inwardly directed face of the annular radially inwardly extending portion of the flange member, a radially inner surface extending generally axially inwardly of the coupling from a gasket heel to a gasket toe, and an inclined surface extending generally between the rear surface and inner surface of the gasket member and arranged in use to engage the inclined surface of the free end of the sleeve member;

the rear surface of the gasket being, in the relaxed condition, slidable radially inwardly on the annually inner surface of the skirt portion of the flange, radial inward movement or tendency thereof to move being limited by engagement between said shoulder portions on the rear face of the gasket and said axially inner surface of the flange member to limit radially inward movement of the rear surface of the gasket; and tightening means associated with the compression flange member to ensure sealing of the gasket between the sleeve member, the compression flange member and the pipe.

10. The pipe coupling claimed in claim 9 for connecting two abutting plain ended pipes, and including compression flange members, sealing gaskets, and tightening means at each end of a double ended sleeve member, the internal surface of each end of the sleeve member being outwardly inclined.

11. The pipe coupling claimed in claim 10 wherein the tightening means comprises bolts or screws extending between radially outwardly extending portions of the compression flange members at each end of the open ended sleeve member.

12. The pipe coupling claimed in claim 9 wherein the pipe engaging, generally axial, surface of the gasket is provided with a plurality of ridges to provide a multiplicity of high pressure contact points to assist sealing.

* * * * *

UNITED STATES PATENT AND TRADEMARK OFFICE
CERTIFICATE OF CORRECTION

PATENT NO. : 5,476,292
DATED : December 19, 1995
INVENTOR(S) : BRIAN HARPER

It is certified that error appears in the above-indentified patent and that said Letters Patent is hereby corrected as shown below:

Under References Cited, insert --Foreign Patent Documents

GB 2251905A 7/92 UNITED KINGDOM --

Col. 7, line 42, after "axially", insert --inwardly--

Signed and Sealed this

Nineteenth Day of March, 1996

Attest:

BRUCE LEHMAN

Attesting Officer         Commissioner of Patents and Trademarks